United States Patent [19]

Rusby

[11] 3,959,663

[45] May 25, 1976

[54] TIDE-POWERED ELECTRICAL GENERATOR

[76] Inventor: Joseph V. Rusby, 2230 Granada Drive, South Daytona, Fla. 32019

[22] Filed: Sept. 19, 1974

[21] Appl. No.: 507,289

[52] U.S. Cl. .................................. 290/53; 60/497; 417/333
[51] Int. Cl.² ......................................... F03B 13/12
[58] Field of Search ........................... 417/335–336; 290/42, 45, 53, 54; 60/497–505

[56] References Cited
UNITED STATES PATENTS

| 332,875 | 12/1885 | Bussard et al. | 417/331 |
| 975,157 | 11/1910 | Quedens | 290/42 |
| 998,756 | 7/1911 | Dean | 417/330 |
| 1,104,510 | 7/1914 | Ishii | 417/330 |
| 1,393,472 | 10/1921 | Williams | 290/42 |
| 3,664,125 | 5/1972 | Strange | 290/53 |
| 3,668,412 | 6/1972 | Vrana et al. | 290/53 |

Primary Examiner—Robert K. Schaefer
Assistant Examiner—John W. Redman
Attorney, Agent, or Firm—Daniel M. Schaeffer

[57] ABSTRACT

A tide-powered electrical generator wherein the energy from successive rising tides is stored in the form of potential energy for selective conversion to electricity. A float is constrained to vertical motion and it raises on successive tides a weight by means of a jack bar to reach a maximum predetermined height on a stable support structure where the weight is supported until release for the generation of electricity. Provision is made for the prevention of damage to the generator by excessive tidal rises.

10 Claims, 3 Drawing Figures

TIDE-POWERED ELECTRICAL GENERATOR

BACKGROUND OF THE INVENTION

The recent energy crisis has stimulated interest in utilizing the tides to produce energy from sources which do not cause pollution or require the use of scarce, non-renewable and/or expensive resources. In this respect, interest has been focused on utilizing tidal energy.

Various inventions in the past utilized either wave and/or tidal energy. Those which were based on tidal energy used pulley systems and/or rack and pinion systems and were concerned primarily with obtaining continuous rotation of a shaft on both rise and fall of tides to provide continuous electrical generation. These prior art systems were by their very nature limited to use in areas having very marked tidal differences. Wave motors are forced to rely upon the vagaries of nature to produce waves strong enough to activate them.

Modern day electrical consumption peaks during certain hours of the day where the demand is greater. Prior art devices which rely on tidal action to produce a continuous generation of electricity are incapable of producing significant amounts of current at peak hours to render them practical as a peak performance source of electricity. They are, in effect, non-responsive to demand.

SUMMARY OF THE INVENTION a declining

These and other defects of the prior art are overcome by my invention wherein I provide for the mechanical storage of energy from successive tides as potential energy for conversion to electrical energy on demand at periods of peak power consumption. My device is a tide-powered electrical generator for use on a body of water subject to tidal action comprising flotation means for responding to a rising tide by vertical translation; energy storing means comprising s weight; jack bar means mounted on said flotation means for successively engaging said weight during successive rising tide movements, said jack bar means being disengaged from said weight during declinging tide movements; means defining a stable structure substantially non-responsive to said tidal action, said stable structure including means for supporting said weight against downward movement but permitting said weight to be raised by said jack bar means; and, means for selectively converting to electrical energy the potential energy stored in said weight after being raised by tidal action.

DESCRIPTION OF THE PREFERRED EMBODIMENT

Figure 1:
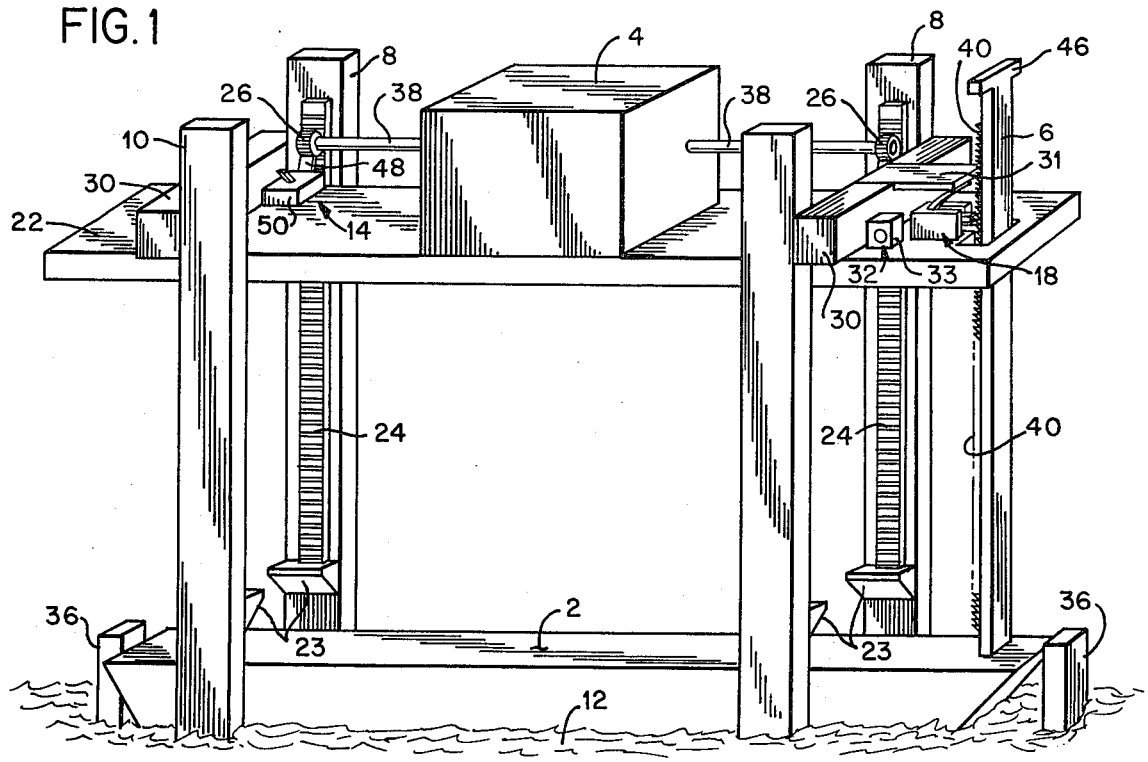
FIG. 1 is a somewhat schematic perspective elevation view of a preferred embodiment of my invention.

FIG. 1 shows a tide-powered electrical generator designed in accordance with the principles of my invention wherein a flotation means 2 such as a barge, tank or ship is confined by a cage, preferably of pilings 8, 10 and 36, fixedly moored in the sea bed. The cage of sufficient height to keep the flotation means 2 entrapped during extreme high tides thus provides means for restraining lateral movement of flotation means 2, thereby constraining flotation means 2 to vertical movement in response to tidal changes.

Figure 2:
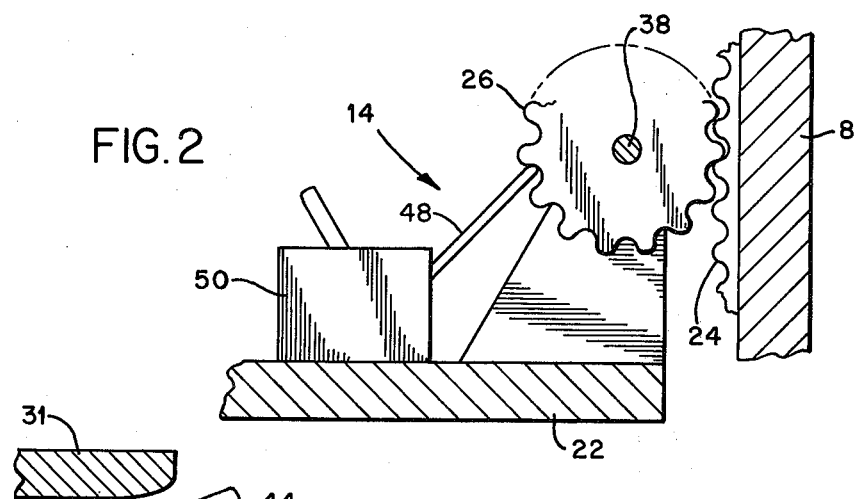
FIG. 2 is an enlarged schematic view illustrating in detail the arrangement of rotary gear mechanism 14 of FIG. 1.

In this embodiment of my invention, a stable structure is formed of pilings 8 and 10, each having gear tracks 24 which are engageable with a rotary gear mechanism 14 mounted on platform 22 in a manner which provides that platform 22 can ride up and down the gear tracks 24 of pilings 8 and 10. Pilings 8 and 10 preferably have a support shelf 23 which supports platform 22 at its lowest design height with clearance above the maximum design level for flotation means 2 during an extreme high tide. Rotary gear mechanism 14 can be of the conventional pawl and ratchet type, as shown in FIG. 2, which will permit free upward movement of the gear mechanism 14 along gear tracks 24 with pawl 48 engaging with gear means 26 to prevent downward motion of platform 22. Selective release of pawl 48 by mechanical, manual and/or electrical means, indicated by 50, permits selective downward motion of platform 22.

Energy storing means 4 is mounted on platform 22, which in the embodiment of FIG. 1 also contains means for converting mechanical power obtained from shaft 38 which has mounted thereon gear means 26, which gear means 26 is operably connected to the gear tracks 24 of piling 8. Rotation of shaft 38 permits the production of electrical power by turning an electrical generator which is housed in energy storing means 4 but not shown in FIG. 1. Additional shafts and gearing means can be utilized by connection to the gear tracks 24 of piling 10. The energy storing means 4, in the preferred embodiment of my invention, is preferably geared or clutched to permit free wheeling of shaft 38 upon upward movement of the platform 22. However, gearing mechanisms such as those shown in U.S. Pat. No. 884,080, issued on Apr. 7, 1908, to G. T. Fallis, entitled Wave Motor, can be advantageously adapted by those skilled in the art for use in my invention. The energy storing means 4 of the device shown in FIG. 1 should be of a magnitude that its mass approaches the safe maximum displacement of flotation means 2. The mass displacement of flotation means 2 will, of course, determine the total amount of weight permissible on platform 22 which can be raised during the practice of my invention taking into account the mass of all of the objects that are to be raised by flotation means 2.

Figure 3:
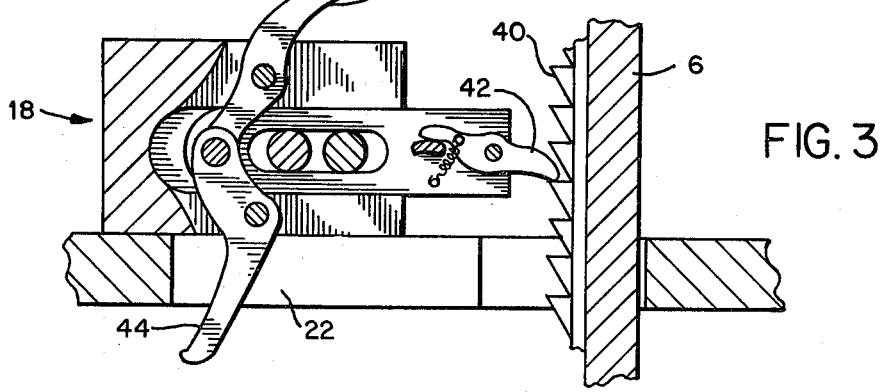
FIG. 3 is an enlarged, fragmentary, partially sectional elevation view of jack bar 6 and latching mechanism 18 of FIG. 1.

Jack bar 6, mounted on flotation means 2, has ratch 40 which is selectively operably connected to latching means 18, which latching means 18 is mounted on platform 22. Latching means 18 includes spring biased pawl 42, shown in FIG. 3, which engages with ratch 40 of jack bar 6 resulting in the elevation of platform 22 during upward movement of flotation means 2 during rising tides and allows free downward movement of flotation means 2 during falling tides. Latching means 18 includes lever means 44 for selectively engaging pawl 42 and for automatically disengaging pawl 42 when platform 22 reaches maximum design height and activates alarm 32. Jack bar 6 includes at its upper end flange means 46 for supporting said jack bar 6 on platform 22 at any time that jack bar 6 is not in contact with flotation means 2, as in the event of extreme low tides or removal of flotation means 2 for repair or replacement.

Jack bar 6 and pilings 8 and 10 should be of sufficient height to permit successive raises of platform 22 each equal to the tidal differential. By tidal differential is meant the difference between the height of the surface of the tidal water at high tide and low tide. Thus, in an area of the ocean which has a normal tidal differential of 3 feet, the height of pilings 8 and 10 and the jack bar 6 can be of an order of magnitude to permit platform 22 to be raised to a total of 6 feet or more over a period of two successive tidal cycle changes. Greater platform rises over an increased number of tidal cycles can be built into the system as desired. It will be obvious to those skilled in the art that tidal-powered electrical generators can be designed utilizing the principles of my invention which can be adapted to the tidal conditions including areas having relatively low tidal differentials wherein prior art devices have been found to be inefficient and uneconomical.

Pilings 8 and 10 are provided with a horizontal cross-tie member 30 at a preselected height adjacent their upper ends to define a maximum design height beyond which further upward movement of platform 22 is prevented by interaction of platform 22 with cross-tie member 30. By thus limiting upward motion, cross-tie member 30 provides a means for preventing energy storing means 4 from disengaging from the stable structure. Cross-tie member 30, adjacent jack bar 6, is provided with a projecting member 31 for activating the disengagement of latching means 18 by interaction with lever means 44 when platform 22 reaches maximum design height. Alarm 32, mounted on cross-tie member 30, is activated when its sensing element 33 contacts platform 22.

Having described a first preferred embodiment of my invention and its construction and mode of operation, it will now become obvious to mechanics and skilled artisans to modify the details of the structure of my invention without departing from its teaching in order to adapt the invention to special situations or special conditions. For example, shelf 23 can be replaced by its equivalent structure in the form of a horizontal deck connecting together all pilings 8 and 10, thereby strengthening the stable structure. Also, piling 36 can be replaced by members depending from the stable structure, as from the deck, to provide the equivalent restraint to flotation means 2.

Similarly, it would also become obvious to provide a plurality of energy storing means 4, each having a separate support platform 22, a jack bar 6, and the necessary gear tracks 24 and gear means 26. These separate energy storing means could obviously be used with individual flotation means or all of the separate storing means could use a single flotation means of extended size.

When a plurality of energy storing means is employed with a single flotation means, it becomes possible to utilize individual storing means having a weight selected such that the sum total of the combined weights selected of the plurality exceeds the mass displacement of the flotation means. In such an embodiment of my invention, I provide a readily available control device of a type which will preclude the engagement of any jack bar for raising a weight if the raising of the said weight when added to the sum total of the other weights being raised simultaneously would exceed the mass displacement of the flotation means. In such an embodiment, a computerized servo-mechanism can be advantageously employed to enable the individual jack bars in a plurality of energy storing means to operate in such a manner that at no time will the jack bars collectively engage with individual energy storing means having a mass greater than the mass of the mass displacement of the flotation means. Indeed, such computerized servo-mechanisms can be employed advantageously to completely operate the tide-powered electrical generators of my invention by coordinating the actions of the jack bar with the energy storing means and the conversion of the potential energy to electrical energy. They can be further adapted to sound alarms and shut down the mechanism in the event of a failure in any part of the system.

In any embodiment of my invention where a plurality of energy storing means is provided, economics make it obvious to those skilled in the art to employ a single means for converting mechanical power, preferably located on a deck of the stable structure, and means for coupling each falling weight to the means for converting mechanical power, as is known in the art. In such an embodiment, the energy storing means could be essentially a pure mass for which any inexpensive, readily available, dense material could be used. In such an embodiment, I preferably use depleted uranium, which is a government surplus material which meets all these criteria and can be used without economic penalty.

Thus, it is within the scope of my invention to utilize government surplus ships and the like as a flotation means, and government surplus heavy metal depleted uranium as an energy storing means.

It will be obvious to one skilled in the art that my invention will be capable of a wide variety of uses wherein prior art devices are impractical, such as areas in which the tidal rise is 3 feet or less. In such areas, successive tides can be utilized to store considerable amounts of potential energy for production of electrical power at a later time. Such a device is especially useful in powering navigational signals in foul weather. Indeed, Coast Guard light ships currently fixed in place off-shore and off-shore oil drilling rigs can benefit from my invention by incorporating the electrical generator of my invention in their original construction plans and be provided with an efficient, economical, non-polluting source of electrical power.

Now, having described the invention and the manner and process of making and using it, in full, clear, concise and exact terms so that one skilled in the art can make and use same, and having set forth the best mode contemplated by the inventor of carrying out this invention in accordance with the statute, and aware that many variations of the invention can be practiced without departing from the spirit and the teachings of this specification, my invention should not be narrowly limited to the embodiment herein disclosed and illustrated, but should be construed broadly, according to the appended claims.

I claim:

1. A tide-powered electrical generator for use on a body of water subject to tidal action, comprising:
    flotation means for responding to a rising tide by vertical translation;
    energy storing means comprising a weight;
    jack bar means mounted on said flotation means for successively engaging said weight during successive rising tide movements for raising said weight in successive movements, said jack bar means disengaged from said weight during declining tide movements;

means defining a stable structure substantially non-responsive to said tidal action, said stable structure including means for supporting said weight against downward movement but permitting said weight to be raised by said jack bar means; and means for selectively converting to electrical energy the potential energy stored in said weight after being raised by tidal action.

2. The electrical generator of claim 1 which includes locking means to prevent downward movement and permit upward movement of said energy storing means.

3. The electrical generator of claim 2 in which said means for selectively converting includes means for releasing said locking means to permit said energy storing means to drop in order to generate said electricity and means for disengaging said jack bar means.

4. The electrical generator of claim 2 in which said energy storing means comprises a plurality of individual weights and is provided with selection means for selectively engaging said individual weights each with a said jack bar means and a said locking means.

5. The electrical generator of claim 4 wherein said plurality of said individual weights has a total mass when added together which is greater than the mass displacement of said flotation means and said selection means includes means for engaging at one time only a portion of said plurality of said weights each with a said jack bar means, said portion of said plurality of such weights having a mass which is less than the mass displacement of said flotation means.

6. The electrical generator of claim 1 in which said stable structure is provided with guide means to restrain lateral motion of said flotation means.

7. The electrical generator of claim 1 in which said stable structure is provided with means for preventing said weights from completely disengaging from said stable structure.

8. The electrical generator of claim 7 in which said means for preventing said weights from completely disengaging from said stable structure is provided with an alarm.

9. The electrical generator of claim 8 in which said means for preventing said weights from completely disengaging from said stable structure includes means for activating means for disengaging the said jack bar to prevent further raising of said weights.

10. A tide-powered electrical generator for use on a body of water subject to tidal action, comprising:

flotation means for responding to a rising tide by vertical translation;

energy storing means comprising a plurality of individual weights having a mass when added together which is greater than the mass displacement of said flotation means;

jack bar means mounted on said flotation means for selectively and successively engaging a portion of said weights during successive rising tide movements for raising said portion of said weights in successive movements, said jack bar means being disengaged from said weights during declining tide movements, said portion of said plurality of said weights having a total mass which is less than the mass displacement of said flotation means;

means defining a stable structure substantially non-responsive to said tidal action, said stable structure including guide means to restrain lateral motion of said flotation means, means for supporting said weights, selective locking means to prevent the downward movement and permit the free upward movement of said weights on an independent basis, means for preventing said weights from completely disengaging from said stable structure, said means for preventing said weights from completely disengaging from said stable structure including alarm means and means for activating a means for disengaging said jack bar means to prevent further raising of said weights; and, means for selectively converting to electrical energy the potential energy stored in individual said weights after said weights are raised by tidal action including means to selectively release said selective locking means to permit individual said weights to drop in order to generate said electricity.

* * * * *

UNITED STATES PATENT OFFICE
CERTIFICATE OF CORRECTION

Patent No. 3,959,663          Dated May 25, 1976

Inventor(s) Joseph V. Rusby

It is certified that error appears in the above-identified patent and that said Letters Patent are hereby corrected as shown below:

Column 1, line 30, cancel " a declining "; line 40, cancel " s ", insert -- a --; line 44, cancel " declinging " and insert -- declining --.

Signed and Sealed this

Twenty-sixth Day of October 1976

[SEAL]

Attest:

RUTH C. MASON
Attesting Officer

C. MARSHALL DANN
Commissioner of Patents and Trademarks